United States Patent [19]
Jen et al.

[11] Patent Number: 4,742,318
[45] Date of Patent: May 3, 1988

[54] BIREFRINGENT SINGLE-MODE ACOUSTIC FIBER

[75] Inventors: Cheng-Kuei Jen, Brossard; Gerald W. Farnell, Montreal, both of Canada; Ahmad Safaai-Jazi, Blacksburg, Va.

[73] Assignee: Canadian Patents and Development Limited - Societe Canadienne Des Brevets et D'Exploitation Limitee, Ottawa, Canada

[21] Appl. No.: 27,874

[22] Filed: Mar. 19, 1987

[30] Foreign Application Priority Data

Nov. 18, 1986 [CA] Canada .................. 523,255

[51] Int. Cl.$^4$ .............................................. H03H 9/30
[52] U.S. Cl. .................. 333/141; 333/147; 333/239
[58] Field of Search ........................ 333/141–149, 333/150–155, 193–196, 186, 187, 239, 248; 181/0.5, 138, 139, 141, 142, 400

[56] References Cited

U.S. PATENT DOCUMENTS

| | | | |
|---|---|---|---|
| 3,406,358 | 10/1968 | Seidel et al. | 333/150 |
| 3,605,043 | 9/1971 | Bienvenu et al. | 333/145 |
| 3,736,532 | 5/1973 | Armenakas | 333/145 |
| 3,824,505 | 7/1974 | Borner | 333/145 |
| 3,922,622 | 11/1975 | Boyd et al. | 333/145 |
| 4,077,023 | 2/1978 | Boyd et al. | 333/147 |

*Primary Examiner*—Marvin L. Nussbaum
*Attorney, Agent, or Firm*—Schwartz, Jeffery, Schwaab, Mack, Blumenthal & Evans

[57] ABSTRACT

A birefringent single-mode acoustic fiber for propagating linearly polarized shear acoustic waves while preserving linear polarization, comprises an elongated core region of a solid material in which acoustic waves can be propagated in two orthogonal shear mode components, and a cladding region enclosing all surfaces of the core region except end surfaces thereof, the cladding region being also of a solid material in which acoustic waves can be propagated in two orthogonal shear mode components. The core and cladding regions have different shear wave velocities with the shear wave velocity of the core region being lower than that of the cladding region, the core or cladding region being characterized by at least one birefringence causing factor selected from the group consisting of (a) noncircular geometry of the core region, (b) asymmetry of shear wave velocity distribution in the core region and (c) asymmetrical stress induced in the cladding region, whereby to strongly break degeneracy between the two orthogonal shear mode components and preserve linear polarization thereof throughout the fiber. The birefringent single-mode acoustic fiber according to the invention is particularly useful in acoustic fiber sensor systems for monitoring environmental changes in pressure, temperature, strain, stress, etc.

30 Claims, 4 Drawing Sheets

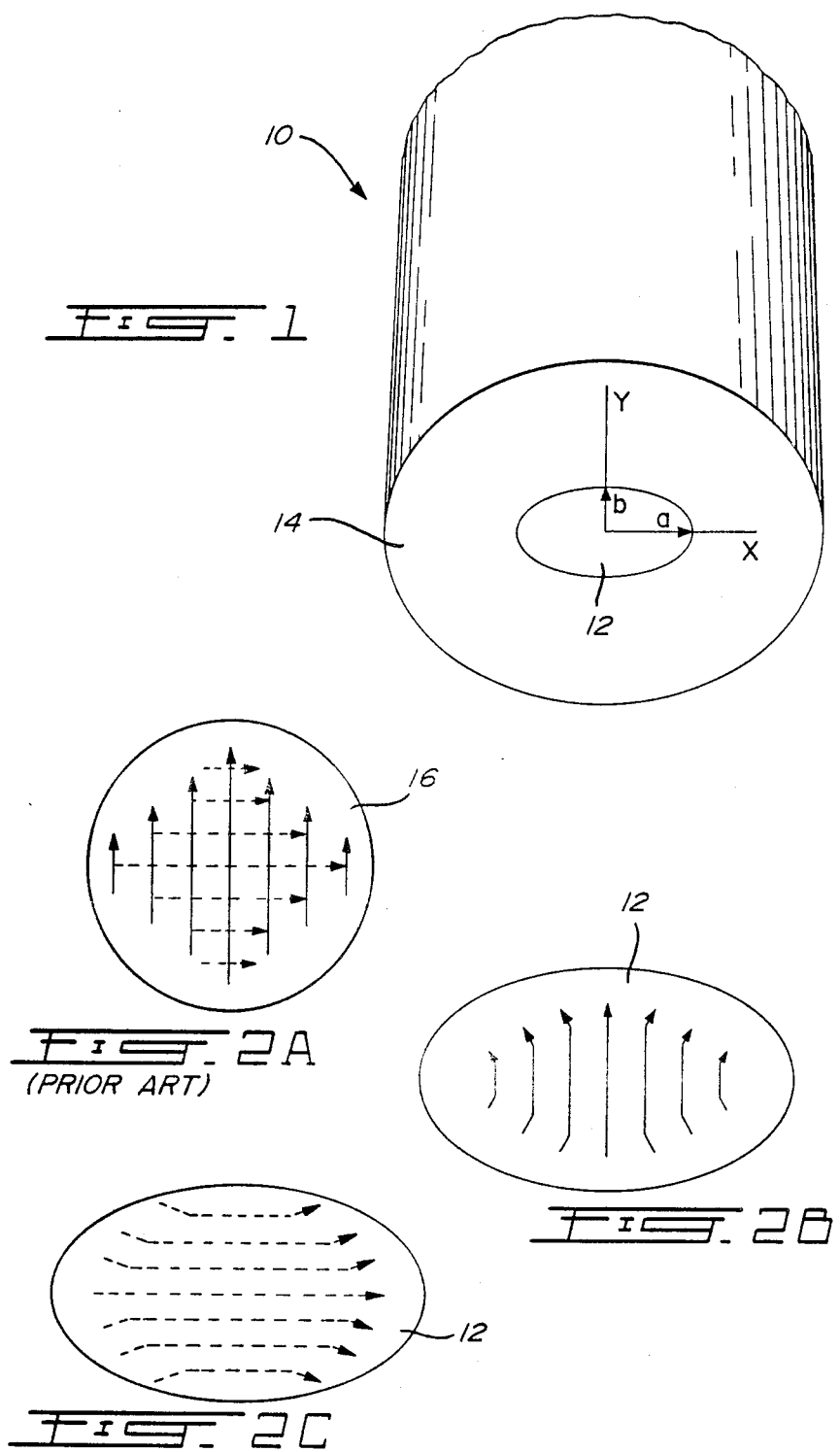

BIREFRINGENT SINGLE-MODE ACOUSTIC FIBER

BACKGROUND OF THE INVENTION

The present invention relates to improvements in the field of elastic waveguides. More particularly, the invention is concerned with an improved single-mode acoustic fiber for propagating acoustic waves in transverse-type modes.

U.S. Pat. No. 3,922,622 issued to G. D. Boyd and L. A. Coldren on Nov. 25, 1975 discloses a form of waveguide for elastic or acoustic waves. Such a waveguide comprises an elongated control liquid or solid core region and an outer solid cladding region enclosing all surfaces of the core region except end surfaces thereof, both regions being composed of materials in which acoustic waves can be propagated. The core and cladding materials are selected so that they focus and contain acoustic wave energy predominantly within the core region. The Boyd-Coldren waveguide is adapted to propagate acoustic waves in radial and torsional modes as well as in longitudinal modes.

Also known in the art is an elastic waveguide for propagating acoustic waves in yet a fourth set of modes, referred to as the shear modes (U.S. Pat. No. 4,077,023 to G. D. Boyd and R. N. Thurston). The shear modes are characterized by a principal particle displacement which is substantially perpendicular to a plane passing through the central longitudinal axis of the core region. The Boyd-Thurston waveguide has solid core and cladding regions where the shear wave velocity of the cladding region is larger than the shear wave velocity of the core region.

In a single shear-type mode acoustic fiber with a core of circular cross-section, such as that disclosed in the Boyd-Thurston patent, polarization of the fundamental shear mode $F_{11}$ can be resolved into two orthogonal components $F_{11X}$ and $F_{11Y}$. When the circularity of the core is perfect and is maintained along the fiber length, the propagation coefficient of the modes in the two orthogonal directions are exactly the same. The input state of polarization should be maintained along the fiber such that at the fiber output the polarization of the mode is predominantly in one direction if it so launched at the input.

However, in practice, geometrical distortions such as kinks and bends as well as material inhomogenities in the fiber induce power coupling between the modes in the two orthogonal directions, thus removing the degeneracy between the two modes and making the single mode fiber "bi-modal". As a result, if a linearly polarized shear acoustic wave transducer is used to excite only one of these two modes, some of the power will be coupled to the other mode, thereby altering the polarization state of the shear acoustic waves in the fiber, and the state of polarization at the fiber output will thus be arbitrary. In other words, the polarization of another shear wave transducer arranged at the fiber output to receive the maximum amount of transmitted acoustic energy will be uncertain. This coupling is also environmentally sensitive so that not only is the polarization state at the output different from that at the input, but it may vary in time as well. Moreover, since the shear acoustic wave transducer is generally bonded by epoxy to the fiber, it cannot be easily displaced to coincide with maximum output acoustic energy transmitted at the receiving end of the fiber. Similar alignment problems apply at the transmitting end of the fiber when the latter is used for reflection geometry.

SUMMARY OF THE INVENTION

It is therefore an object of the present invention to overcome the above drawbacks and to provide a birefringent single-mode acoustic fiber for propagating linearly polarized shear acoustic waves while preserving linear polarization.

In accordance with the invention, then is thus provided a birefringent single-mode acoustic fiber for propagating linearly polarized shear acoustic waves while preserving linear polarization, comprising an elongated core region of a solid material in which acoustic waves can be propagated in two orthogonal shear mode components, and a cladding region enclosing all surfaces of the core region except end surfaces thereof, the cladding region being also of a solid material in which acoustic waves can be propagated in two orthogonal shear mode components. The core and cladding regions have different shear wave velocities with the shear wave velocity of the core region being lower than that of the cladding region, the core or cladding region being characterized by at least one birefringence causing factor selected from the group consisting of (a) non-circular geometry of the core region, (b) asymmetry of shear wave velocity distribution in the core region and (c) asymmetrical stress induced in the cladding region, whereby to strongly break degeneracy between the two orthogonal shear mode components and preserve linear polarization thereof throughout the fiber.

Applicant has found quite unexpectedly that of the three transverse-type modes in which an acoustic wave can be propagated, namely the flexural (F), torsional (T) and radial-axial (R) modes, birefringent effect only exists in the fundamental or flexural shear mode ($F_{11}$ mode). Applicant has further discovered that by intentionally introducing selected asymmetries in a singlemode acoustic fiber in which acoustic waves can be propagated in two orthogonal shear mode components ($F_{11X}$ and $F_{11Y}$), degeneracy between the modes in the two orthogonal directions can be broken. As mentioned above, the asymmetry needed to break the degeneracy strongly can result from noncircular geometry of the core region, asymmetry of shear wave velocity distribution in the core region and asymmetrical stress induced in the cladding region, or a combination thereof. The resulting difference in the propagation constants of the two shear mode components will cause the undesirable coupling therebetween to be eliminated.

Although birefringent single-mode optical fibers are known in the art, it should be noted that acoustic fibers are distinct from optical fibers. Acoustic fibers are adapted to propagate acoustic waves whereas optical fibers are adapted to propagate electromagnetic waves, and an acoustic wave is fundamentally different from an electromagnetic wave. Indeed, an acoustic wave is an elastic or mechanical wave which is characterized by particle displacement, i.e. a single component wave. An electromagnetic wave, on the other hand, is a two-component wave which is characterized by an electric field component and a magnetic field component. As is also known in the art, the material dispersion mechanisms are different for acoustic and optical modes in weakly guiding fibers.

In weakly guiding acoustic fibers, the weak guidance conditions are governed by the following two relations:

$$0 < \frac{V_{S2} - V_{S1}}{V_{S1}} << 1$$

where $V_{S1}$ and $V_{S2}$ are respectively the shear wave velocities of the core and cladding regions, and $$\left| \frac{\rho_2 - \rho_1}{\rho_1} \right| << 1$$

where $\rho_1$ and $\rho_2$ are respectively the material densities of the core and cladding regions. Weakly guiding fibers have less dispersion and larger core radius for single mode operation than strontly guiding fibers.

Thus, the core and cladding materials may be the same except that at least one thereof is doped with a sufficient percentage of a different material to provide substantially equal material densities in both the core and cladding regions and lower shear wave velocity in the core region. For instance, the core and cladding materials may be doped fused silica having a same dopant but in different percentages to provide substantially equal material densities in both the core and cladding regions and lower shear wave velocity in the core region. Alternatively, the core and cladding materials may be doped fused silica having different dopants in sufficient percentages to provide the required material densities and lower shear wave velocity. The cladding material may also be pure fused silica and the core material fused silica doped with a dopant in sufficient percentage to provide substantially equal material densities in both the core and cladding regions and lower shear wave velocity in the core region.

The following table lists the material properties of several glasses which may be used in accordance with the invention for the core and cladding regions:

TABLE 1

| Properties of Suitable Glasses | | |
|---|---|---|
| Composition | P (Kg/m³) | $V_S$ (m/s) |
| 100% SiO$_2$ | 2202 | 3764 |
| 95% SiO$_2$ 5% B$_2$O$_3$ | 2187 | 3601 |
| 85% SiO$_2$ 15% B$_2$O$_3$ | 2169 | 3099 |
| 97% SiO$_2$ 3% GeO$_2$ | 2244 | 3677 |
| 92.5% SiO$_2$ 7.5% TiO$_2$ | 2213 | 3625 |

According to a preferred embodiment of the invention, the core region has a noncircularly symmetric cross-section and the cladding region has a circularly symmetric cross-section. For example, the core region may have an elliptical profile defining a long axis X and a short axis Y; in this case, shear wave propagation is effected predominantly along axis X.

According to a further preferred embodiment, the core and cladding regions each have a circularly symmetric cross-section, and the core region is characterized by an asymmetrical shear wave velocity distribution. Such an asymmetrical shear wave velocity distribution may be obtained for instance by the provision in the core region of at least two diametrically opposed, longitudinally extending sub-regions of a material having a shear wave velocity greater than that of the cladding region, the sub-regions together with the core region providing a transversely asymmetrical shear wave velocity distribution. These sub-regions may be arranged in the core region to provide either a smooth or step-like transition between the shear wave velocities of the core region and sub-regions.

According to yet another preferred embodiment, the core region has a circularly symmetric cross-section and the cladding region has asymmetrical stress induced therein. Stress-induced birefringence can be generated by the provision of a cladding region having a noncircularly symmetric cross-section, such as an elliptical cladding region, and by using core and cladding materials having different thermal expansion coefficients with the thermal expansion coefficient of the core material being higher than that of the cladding material. Stress-induced birefringence may also be obtained by the provision of a cladding region having a circularly symmetric cross-section and at least two diametrically opposed, longitudinally extending high stress sub-regions defined in the cladding region, the sub-regions being of a material having a shear wave velocity greater than that of the cladding region. These sub-regions may have a substantially circular cross-section or be in the form of arcuate segments. The materials of the core and sub-regions have different thermal expansion coefficients with the thermal expansion coefficient of the core material being higher than that of the material of the sub-regions.

The birefringent single-mode acoustic fibers according to the invention are particularly useful in acoustic fiber sensor systems for monitoring environmental changes in pressure, temperature, strain, stress, etc., where they may be used for both the reference and sensing arms of such systems.

BRIEF DESCRIPTION OF THE DRAWINGS

Further features and advantages of the invention will become more readily apparent from the following description of preferred embodiments as illustrated by way of example in the accompanying drawings, in which:

FIG. 1 is a partial perspective view of a birefringent single-mode acoustic fiber according to a preferred embodiment of the invention;

FIGS. 2A, 2B and 2C schematically illustrate the changes in principal particle displacement between the fundamental shear $F_{11}$ modes are propagated in a prior art acoustic fiber and the $F_{11X}$ and $F_{11Y}$ modes as propagated in the acoustic fiber shown in FIG. 1;

DESCRIPTION OF PREFERRED EMBODIMENTS

Figure 3:
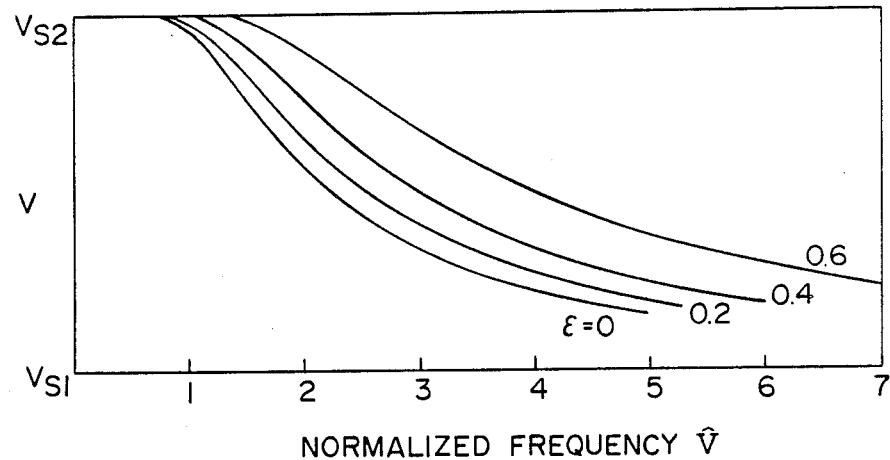
FIG. 3 is a diagram illustrating the phase velocity curves in an acoustic fiber as shown in FIG. 1 with different ellipticities of the core region, versus the normalized frequency.

Referring first to FIG. 1, there is illustrated a birefringent single-mode acoustic fiber generally designated by reference numeral 10 and comprising an elongated core region 12 of elliptical cross-section and a cladding region 14 of circular cross-section, a and b being the radii along the principal X (long) and Y (short) axes respectively of the elliptical core. The cladding region 14 encloses all surfaces of the core region 12, except the end surfaces thereof. The core and cladding materials are selected to provide weakly guiding conditions as established by the following relations:

$$V_{S1} < V_{S2}$$

$$0.01 \leq \frac{V_{S2} - V_{S1}}{V_{S1}} \leq 0.15$$

where $V_{S1}$ and $V_{S2}$ are respectively the shear wave velocities of the core and cladding regions 12 and 14, and $$\left| \frac{\rho_2 - \rho_1}{\rho_1} \right| << 1$$

where $\rho_1$ and $\rho_2$ are respectively the material densities of the core and cladding regions.

The birefringent fiber 10 supports two linearly polarized shear modes $F_{11X}$ and $F_{11Y}$ which will propagate through the fiber displacements of the degenerate $F_{11}$ modes in the core of a prior art acoustic fiber where both the core and cladding are circular are shown in FIG. 2A (only the core 16 being illustrated), while the dominant displacement of the nondegenerate $F_{11X}$ and $F_{11Y}$ modes in the elliptical core 12 of the birefringent fiber 10 are shown in FIGS. 2B and 2C. The dominant particle displacement components of the $F_{11x}$ and $F_{11Y}$ modes are parallel to the X and Y axes respectively.

Let the propagation constant be $\beta_X = \omega/V_X$ for $F_{11X}$ mode and $\beta_Y = \omega/V_Y$ for the $F_{11Y}$ mode, where $\omega$ is the angular frequency, $V_X$ and $V_Y$ are the phase velocities of the $F_{11X}$ and $F_{11Y}$ modes respectively. Let also the shear wave velocity $V_S$ distribution in the elliptical core region 12 and circular cladding region 14 of the birefringent acoustic fiber 10 be defined as:

$$V_S(x,y) = V_{S1} \frac{x^2}{a^2} + \frac{y^2}{b^2} < 1$$

$$V_S(x,y) = V_{S2} \frac{x^2}{a^2} + \frac{y^2}{b^2} > 1$$

where a and b are the radii along the principal X (long) and Y (short) axes respectively of the elliptical core, and $V_{S1}$ and $V_{S2}$ are respectively the shear wave velocities of the core and cladding regions. In FIG. 3, the phase velocity V ($V_X$ for $F_{11X}$ and $V_Y$ for $F_{11Y}$) is plotted against the normalized frequency $\hat{V}$, where $$v = \omega a \left( \frac{1}{V_{S1}^2} - \frac{1}{V_{S2}^2} \right)^{\frac{1}{2}}$$

with many different values of ellipticities $\epsilon$, where $\epsilon$ is the ratio of (a-b)/a. The difference between $V_X$ and $V_Y$ is too small to be shown in the figure.

Since $\beta_X > \beta_Y$, the $F_{11X}$ mode is more strongly guided than the $F_{11Y}$ mode, and the $F_{11X}$ mode is in fact the first higher order mode. Let $\Delta\beta = \beta_X - \beta_Y$, then $\Delta\beta$ becomes larger as the ratio a/b increases.

Figure 4A:
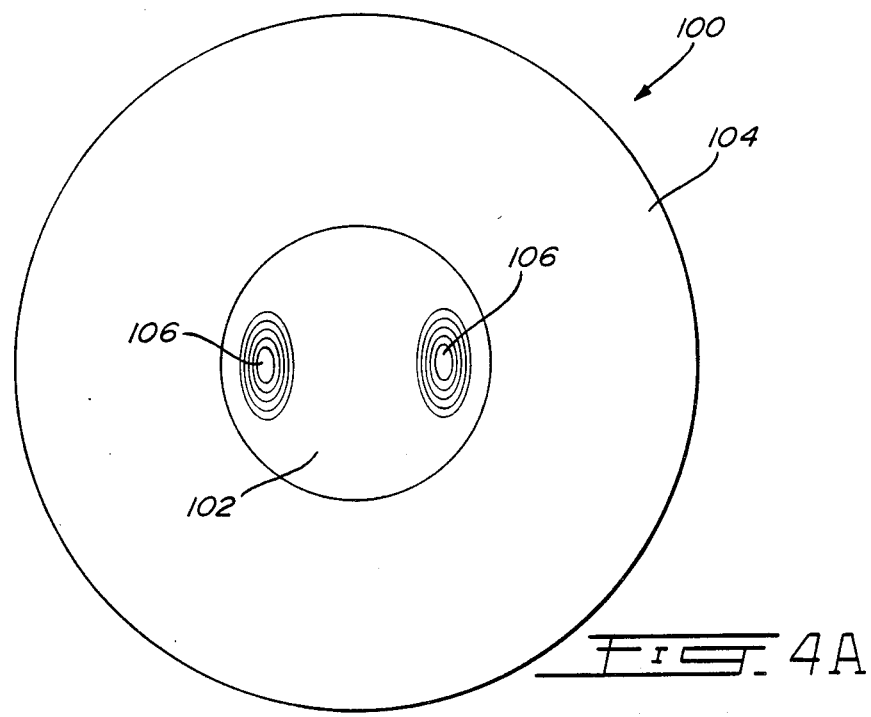
FIGS. 4A and 4B are schematic cross-sectional views showing variants of a birefringent single-mode acoustic fiber according to a further preferred embodiment of the invention.
Figure 4B:
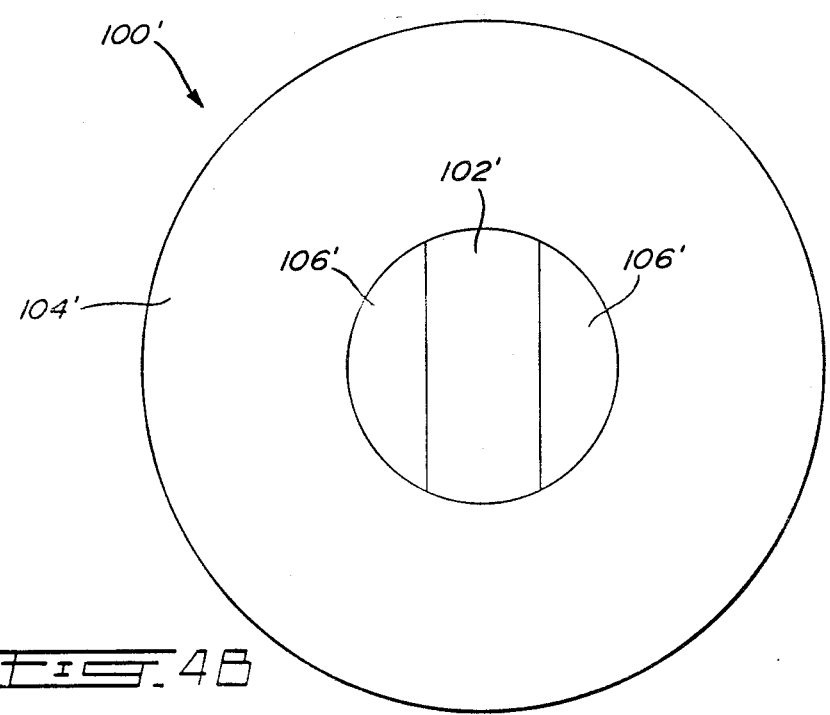
Figure 5A:
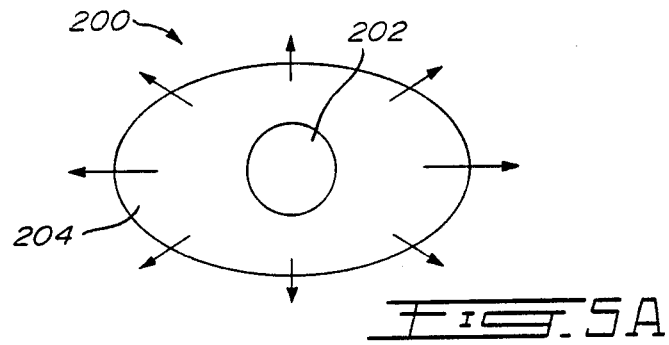
FIGS. 5A, 5B and 5C are schematic cross-sectional views illustrating variants of a birefringent single-mode acoustic fiber according to yet another preferred embodiment.
Figure 5B:
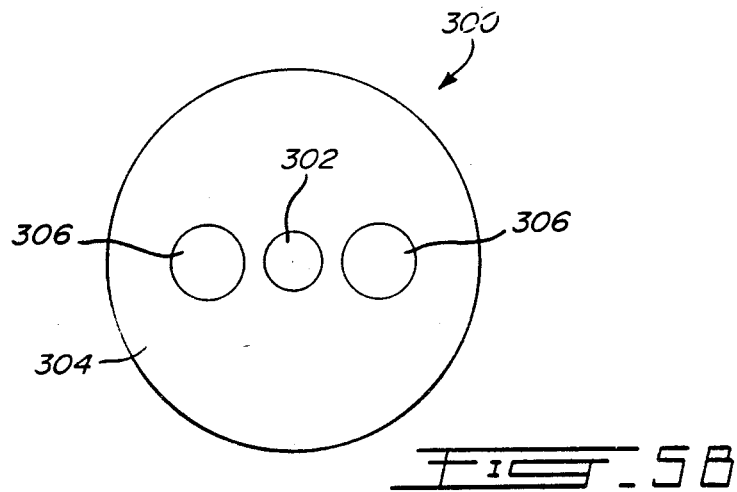
Figure 5C:
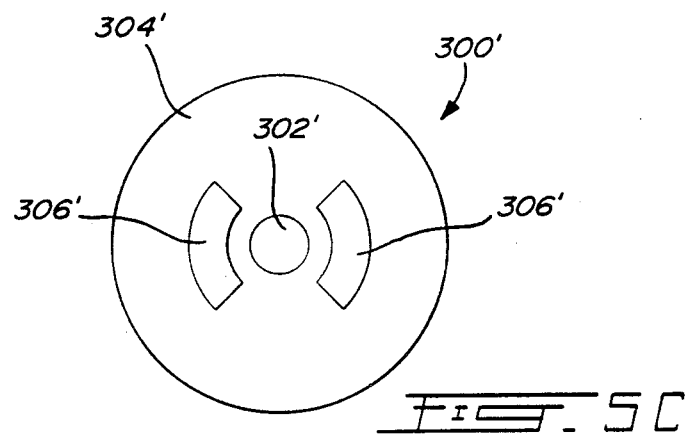

Breaking the degeneracy of the $F_{11}$ mode in an acoustic fiber with a circular core and a circular cladding can also be achieved by causing an asymmetrical shear wave velocity distribution in the core region, as shown in FIGS. 4A and 4B, or by inducing an asymmetrical stress in the cladding region, as shown in FIGS. 5B and 5C. The axes with the low and high stress are similar to the X and Y axes of the acoustic fiber with elliptical core shown in FIG. 1.

More particularly, in the birefringent acoustic fiber 100 which is shown in FIG. 4A and has circular core and cladding regions 102 and 104, asymmetrical shear wave velocity distribution in the core region 102 is caused by the provision in that region of two diametrically opposed, longitudinally extending sub-regions 106 of a material having a shear wave velocity greater than that of the cladding region 104. The sub-regions 106 are arranged in the core region 102 to provide a smooth transition between the shear wave velocities of the core region and sub-regions.

The birefringent acoustic fiber 100' with circular core and cladding regions 102' and 104' illustrated in FIG. 4B is essentially the same as that shown in FIG. 4A, except that the sub-regions 106' of a material having a shear wave velocity greater than that of the cladding region 104' are arranged to provide a step-like transition between the shear wave velocities of the core region 102' and sub-regions 106'. Both acoustic fibers 100 and 100' make on of the two orthogonal $F_{11}$ modes a cutoff mode in a certain value of the normalized frequency $\hat{V}$. In other words, one mode is a guided mode and the other mode is not. It is to be noted that the $F_{11}$ mode polarized along the long axis direction is a lower order mode than that polarized along the short axis direction. Moreover, by selecting the materials of the core region, cladding region and sub-regions such that:

$$V_{S1} < V_{S2} < V_{S3}$$

$$0.01 \leq \frac{V_{S2} - V_{S1}}{V_{S1}} \leq 0.15$$

where $V_{S1}$, $V_{S2}$ and $V_{S3}$ are respectively the shear wave velocities of the core region, cladding region and sub-regions, and $$\left| \frac{\rho_2 - \rho_1}{\rho_1} \right| << 1$$

pps where $\rho_1$ and $\rho_2$ are respectively the material densities of the core and cladding regions, then a single-mode single-polarization fiber with rather large birefringence (i.e. $\Delta\beta$) can be obtained.

Transversely asymmetrical stress distribution along the fiber can also enhance the effect of birefringence. This can be achieved by using core and cladding materials having different thermal expansion coefficients. An example of such a stress-induced birefringent acoustic fiber is shown in FIG. 5A where the acoustic fiber 200 illustrated is seen to comprise a circular core region 202 and an elliptical cladding region 204, the thermal expansion coefficient of the core material being higher than that of the cladding material. The arrows in the figure indicate the directions of the stress.

FIGS. 5B and 5C shown further variants of stress-induced birefringent acoustic fibers. In the acoustic fiber 300 having circular core and cladding regions 302 and 304 illustrated in FIG. 5B, asymmetrical stress in the cladding region 304 is induced by the provision of two diametrically opposed, longitudinally extending high stress sub-regions 306 of a material having a shear wave velocity greater than that of the cladding region 304. As shown, the sub-regions 306 have a substantially circular cross-section. The materials of the core region 302 and sub-regions 306 have also different thermal expansion coefficients with the thermal expansion coefficient of the core material being higher than of the material of the sub-regions.

The stress-induced birefringent acoustic fiber 300' with circular core and cladding regions 302' and 304' illustrated in FIG. 5C is essentially the same as that shown in FIG. 5B, except that the sub-regions 306' of a material having higher shear wave velocity and lower thermal expansion coefficient are in the form of arcuate segments. In either acoustic fiber 300 or 300', the materials of the core region, cladding region and sub-regions are also selected such that:

$$0.01 \leq \frac{V_{S2} - V_{S1}}{V_{S1}} \leq 0.15$$

where $V_{S1}$, $V_{S2}$ and $V_{S3}$ are respectively the shear wave velocities of the core region, cladding region and sub-regions, and $$\left| \frac{\rho_2 - \rho_1}{\rho_1} \right| << 1$$

where $\rho_1$ and $\rho_2$ are respectively the material densities of the core and cladding regions.

Figure 6:
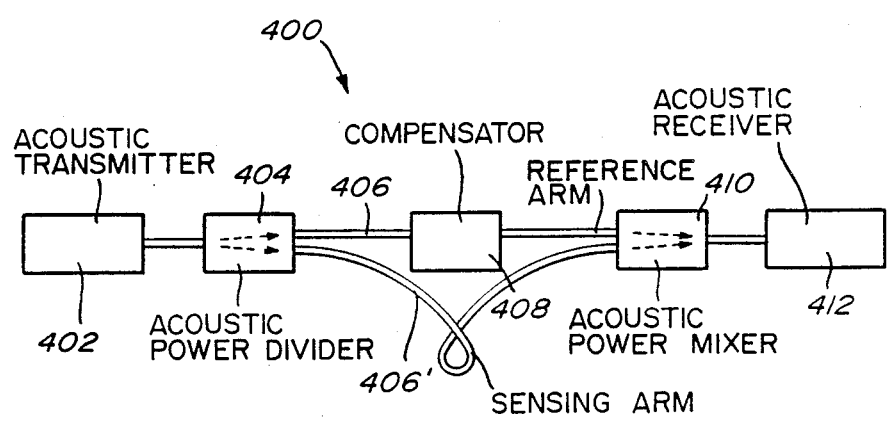
FIG. 6 which is on the same sheet of drawings as FIG. 3 is a schematic representation of an acoustic fiber sensor system in which use is made of birefringent single-mode acoustic fibers according to the invention.

FIG. 6 schematically illustrates an example of application of a birefringent single-mode acoustic fiber according to the invention in an acoustic fiber sensor system generally designated by reference numeral 400, for monitoring environmental changes in pressure, temperature, strain, stress, etc. An acoustic transmitter 402 is provided for launching an acoustic wave which is divided into two components by the acoustic power divider 404 for propagation along two birefringent acoustic fibers 406 and 406'. The acoustic wave component propagating along the fiber 406 is passed through a compensator 408 for adjusting the acoustic phase or velocity to reach maximum sensitivity of the system, and is then re-combined with the acoustic wave component propagating along the fiber 406' by the acoustic power mixer 410. The combined or mixed acoustic wave components are detected by the acoustic receiver 412. The acoustic fiber 406 acts as a reference arm whereas the acoustic fiber 406' acts as a sensing arm or probe situated in a place where changes in temperature, pressure, strain, stress, etc. need to be monitored. The variation of the propagation properties such as intensity, phase, time delay, particle displacement polarization, etc. of acoustic modes in the sensing arm due to the disturbance of some physical quantity can be compared with the reference arm and used as criterion to characterize this mechanism.

We claim:

1. A birefringent single-mode acoustic fiber for propagating linearly polarized shear acoustic waves while preserving linear polarization, comprising
    an elongated core region of a solid material in which acoustic waves can be propagated in two orthogonal shear mode components,
    a cladding region enclosing all surfaces of said core region except end surfaces thereof, said cladding region being also of a solid material in which acoustic waves can be propagated in two orthogonal shear mode components, and
    wherein said core and cladding regions have different shear wave velocities with the shear wave velocity of the core region bein lower than that of the cladding region, at least one of said regions being characterized by at least one birefringent causing factor for breaking degeneracy between said two orthogonal shear mode components and preseving linear polarization thereof throughout the fiber.

2. An acoustic fiber as defined in claim 1, wherein the core and cladding materials are selected such that the core and cladding regions have respective shear wave velocities satisfying the following relation:

$$0 < \frac{V_{S2} - V_{S1}}{V_{S1}} << 1$$

where $V_{S1}$ and $V_{S2}$ are respectively the shear wave velocities of the core and cladding regions.

3. An acoustic fiber as defined in claim 2, wherein the core and cladding materials are selected such that the core and cladding regions have respective shear wave velocities satisfying the following relation:

$$0.01 \leq \frac{V_{S2} - V_{S1}}{V_{S1}} \leq 0.15$$

where $V_{S1}$ and $V_{S2}$ are respectively the shear wave velocities of the core and cladding regions.

4. An acoustic fiber as defined in claim 2, wherein thecore and cladding materials are selected such that the core and cladding regions have respective material densities satisfying the following relation:

$$\left| \frac{\rho_2 - \rho_1}{\rho_1} \right| << 1$$

where $\rho_1$ and $\rho_2$ are respectively the material densities of the core and cladding regions.

5. An acoustic fiber as defined in claim 4, wherein the core and cladding materials are the same except that at least one thereof is doped with a sufficient percentage of a different material to provide substantially equal material densities in both said core and cladding regions and lower shear wave velocity in said core region.

6. An acoustic fiber as defined in claim 4, wherein the core and cladding materials are doped fused silica having a same dopant but in different percentages to provide substantially equal material densities in both said core and cladding regions and lower shear wave velocity in said core region.

7. An acoustic fiber as defined in claim 4, wherein the core and cladding materials are doped fused silica having different dopants in sufficient percentages to provide substantially equal material densities in both said core and cladding regions and lower shear wave velocity in said core region.

8. An acoustic fiber as defined in claim 4, wherein the cladding material is pure fused silica and the core material is fused silica doped with a dopant in sufficient percentage to provide substantially equal material densities in both said bore and cladding regions and lower shear wave velocity in said core region.

9. An acoustic fiber as defined in claim 4, wherein said core region has a noncircularly symmetric cross-section and said cladding region has a circularly symmetric cross-section.

10. An acoustic fiber as defined in claim 9, wherein said core region has an elliptical profile defining a long axis X and a short axis Y, and wherein shear wave propagation is effected predominantly along axis X.

11. An acoustic fiber as defined in claim 4, wherein the core and cladding regions each have a circularly symmetric cross-section, and wherein the core region is characterized by an asymmetrical shear wave velocity distribution.

12. An acoustic fiber as defined in claim 11, wherein at least two diametrically opposed, longitudinally extending sub-regions of a material having a shear wave velocity greater than that of the cladding region are defined in said core region, said sub-regions together with said core region providing a transversely asymmetrical shear wave velocity distribution.

13. An acoustic fiber as defined in claim 12, wherein the materials of the core region, cladding region and sub-regions are selected such that the core region, cladding region and sub-regions have respective shear wave velocities satisfying the following relation:

$$V_{S1} < V_{S2} < V_{S3}$$

and $$0.01 \leq \frac{V_{S2} - V_{S1}}{V_{S1}} \leq 0.15$$

where $V_{S1}$, $V_{S2}$ and $V_{S3}$ are respectively the shear wave velocities of the core region, cladding region and sub-regions.

14. An acoustic fiber as defined in claim 12, wherein said sub-regions are arranged in said core region to provide a smooth transition between the shear wave velocities of the core region and sub-regions.

15. An acoustic fiber as defined in claim 12, wherein said sub-regions are arranged in said core region to provide a step-like transition between the sehar wave velocities of the core region and sub-regions.

16. An acoustic fiber as defined in claim 4, wherein the core region has a circularly symmetric cross-section and the cladding region has asymmetrical stress induced therein.

17. An acoustic fiber as defined in claim 16, wherein said cladding region has a noncircularly symmetric cross-section, and wherein the core and cladding materials have different thermal expansion coefficients with the thermal expansion coefficient of the core material being higher than that of the cladding material.

18. An acoustic fiber as defined in claim 17, wherein said cladding region has an elliptical profile.

19. An acoustic fiber as defined in claim 16, wherein said cladding region has a circularly symmetric cross-section and at least two diametrically opposed, longitudinally extending high stress sub-regions are defined in said cladding region, said sub-regions being of a material having a shear wave velocity greater than that of the cladding region.

20. An acoustic fiber as defined in claim 19, wherein said sub-regions have a substantially circular cross-section.

21. An acoustic fiber as defined in claim 19, wherein said sub-regions are in the form of arcuate segments.

22. An acoustic fiber as defined in claim 19, wherein the materials of the core region and sub-regions have different thermal expansion coefficients with the thermal expansion coefficient of the core material being higher than that of the material of the sub-regions.

23. An acoustic fiber as defined in claim 19, wherein the materials of the core region, cladding region and sub-regions are selected such that the core region, cladding region and sub-regions have respective shear wave velocities satisfying the following relation:

$$V_{S1} < V_{S2} V_{S3}$$

and $$0.01 \leq \frac{V_{S2} - V_{S1}}{V_{S1}} \leq 1$$

Where $V_{S1}$, $V_{S2}$ and $V_{S3}$ are respectively the shear wave velocities of the core region, cladding region and sub-regions.

24. In an acoustic fiber sensor system having a reference arm and a sensing arm, the improvement wherein said reference and sensing arms each comprise a birefringent single-mode acoustic fiber as defined in claim 1.

25. An acoustic fiber as defined in claim 1, wherein said core region has a non-circular symmetric cross-section.

26. An acoustic fiber as defined in claim 1, wherein said core region is characterized by an asymmetrical shear wave velocity distribution.

27. An acoustic fiber as defined in claim 1, wherein said cladding region has asymmetrical stress induced therein.

28. An acoustic fiber as defined in claim 25, wherein said core region is characterized by an asymmetrical shear wave velocity distribution.

29. An acoustic fiber as defined in claim 25, wherein said cladding region has asymmetrical stress induced therein.

30. An acoustic fiber as defined in claim 26, wherein said cladding region has asymmetrical stress induced therein.

* * * * *